US008260242B2

(12) United States Patent
Yoshikawa et al.

(10) Patent No.: US 8,260,242 B2
(45) Date of Patent: *Sep. 4, 2012

(54) BANDPASS FILTER, AND RADIO COMMUNICATION MODULE AND RADIO COMMUNICATION DEVICE USING SAME

(75) Inventors: Hiromichi Yoshikawa, Kirishima (JP); Shuichi Yamamoto, Kirishima (JP)

(73) Assignee: Kyocera Corporation, Kyoto (JP)

( * ) Notice: Subject to any disclaimer, the term of this patent is extended or adjusted under 35 U.S.C. 154(b) by 200 days.

This patent is subject to a terminal disclaimer.

(21) Appl. No.: 12/670,856

(22) PCT Filed: May 30, 2008

(86) PCT No.: PCT/JP2008/060078

§ 371 (c)(1), (2), (4) Date: Jan. 26, 2010

(87) PCT Pub. No.: WO2009/016883

PCT Pub. Date: Feb. 5, 2009

(65) Prior Publication Data

US 2010/0203859 A1 Aug. 12, 2010

(30) Foreign Application Priority Data

Jul. 27, 2007 (JP) ................................ 2007-195917

(51) Int. Cl.
*H04B 1/10* (2006.01)
*H01P 3/08* (2006.01)

(52) U.S. Cl. ....................................... 455/307; 333/204

(58) Field of Classification Search .................. 455/296, 455/307, 339; 333/202, 204, 20, 238, 246
See application file for complete search history.

(56) References Cited

U.S. PATENT DOCUMENTS 3,605,045 A * 9/1971 Ramsbotham, Jr. .......... 333/204
(Continued)

FOREIGN PATENT DOCUMENTS

| | | | |
|---|---|---|---|
| JP | 61-258503 | A | 11/1986 |
| JP | 1991/92804 | U | 9/1991 |
| JP | 2004-180032 | A | 6/2004 |
| JP | 2006-166136 | A | 6/2006 |
| JP | 2007-97113 | A | 4/2007 |

(Continued)

OTHER PUBLICATIONS

Li, Keren, et al; "An Ultra-Wideband Bandpass Filter Using Broadside-Coupled Microstrip-Coplanar Waveguide Structure", Proceedings of the IEICE General Conference, Mar. 2005, C-2-114, pp. 147.

*Primary Examiner* — Quochien B Vuong
(74) *Attorney, Agent, or Firm* — Birch, Stewart, Kolasch & Birch, LLP

(57) ABSTRACT

A bandpass filter, and a radio communication module and device using the same are disclosed. Provided is the bandpass filter in which resonant electrodes (30*a*, 30*b*, 30*c*) are disposed in an interdigital manner inside of an annular ground electrode (23) disposed in one interlayer of a laminate (10) composed of a plurality of dielectric layers (11) on the upper and lower surfaces of which first and second ground electrodes (21, 22) are disposed, and in which an input coupling electrode (40*a*) facing the resonant electrode (30*a*) in an input stage in the interdigital manner, an output coupling electrode (40*b*) facing the resonant electrode (30*b*) in an output stage in the interdigital manner, and an input/output coupling conductor (71) which faces the input coupling electrode (40*a*), the resonant electrode (30*a*) in the input stage, the output coupling electrode (40*b*), and the resonant electrode (30*b*) in the output stage and is subjected to electromagnetic field coupling therewith are disposed in the other interlayer of the laminate (10).

18 Claims, 10 Drawing Sheets

U.S. PATENT DOCUMENTS

| | | | | |
|---|---|---|---|---|
| 5,122,768 | A | 6/1992 | Ito et al. | |
| 5,406,235 | A * | 4/1995 | Hayashi | 333/204 |
| 2006/0255885 | A1 | 11/2006 | Yoshikawa et al. | |
| 2009/0140827 | A1 | 6/2009 | Yoshikawa | |

FOREIGN PATENT DOCUMENTS

| | | | |
|---|---|---|---|
| JP | 2007-318661 | A | 12/2007 |
| JP | 2008-118615 | A | 5/2008 |
| WO | WO-2007/138783 | A1 | 12/2007 |

* cited by examiner

BANDPASS FILTER, AND RADIO COMMUNICATION MODULE AND RADIO COMMUNICATION DEVICE USING SAME

TECHNICAL FIELD

The present invention relates to a bandpass filter and a radio communication module and a radio communication device using the same, particularly to a bandpass filter having a remarkably wide passband that can suitably be used for UWB (Ultra Wide Band) and a radio communication module and a radio communication device using the same.

BACKGROUND ART

Recently UWB receives attention as new communication means. In UWB, large-capacity data transfer can be realized within a short range of about 10 m by the use of a wide frequency band. For example, a guideline of US FCC (Federal Communication Commission) has a plan to use a frequency band of 3.1 GHz to 10.6 GHz. One of the features of UWB is that the remarkably wide frequency band is used.

Recently a study on an ultra-wide-band filter that can be used for UWB is actively made. For example, there has been reported that a wide-band characteristic of a passband width exceeding 100% in terms of fractional band width (band width/center frequency) is obtained with a bandpass filter in which a principle of a directional coupler is applied (for example, see Non-patent Document; "Ultra-Wide-Band Bandpass Filter with Micro Strip-cpw Broadside Coupling Structure", IEICE Proceedings (March, 2005) c-2-114, P. 147).

On the other hand, a bandpass filter in which a plurality of quarter-wave stripline resonators are provided in parallel while mutually coupled is well known as a filter frequently used conventionally (for example, see Japanese Patent Publication Laid-Open No. 2004-180032).

However, because the bandpass filters proposed by Non-patent Document and Japanese Patent Publication Laid-Open No. 2004-180032 have problems, and the bandpass filters are not suitable to the UWB bandpass filter.

For example, unfortunately the passband width is excessively wide in the bandpass filter proposed by Non-patent Document. That is, basically a frequency band of 3.1 GHz to 10.6 GHz is used in UWB, and International Telecommunication Union Radiocommunications Sector establishes a plan that the frequency band is divided into a Low Band and a High Band while a frequency of 5.3 GHz used in IEEE 802.11.a is avoided. The frequency band of about 3.1 GHz to about 4.7 GHz is used in the Low Band, and the frequency band of about 6 GHz to about 10.6 GHz is used in the High Band. In Japan, there has been a plan to initially use the Low Band. Therefore, because a passband width of about 40% in terms of fractional band width and attenuation at the frequency of 5.3 GHz are simultaneously required for the filter used in the Low Band, the bandpass filter proposed by Non-patent Document with the passband width exceeding 100% in terms of fractional band width cannot be used due to the excessively wide passband width.

The conventional bandpass filter in which the quarter-wave resonator is used has an excessively narrow passband width, and the fractional band width is lower than 10% even in the bandpass filter disclosed in Japanese Patent Publication Laid-Open No. 2004-180032 that is aimed at the wide band. Therefore, the bandpass filter disclosed in Japanese Patent Publication Laid-Open No. 2004-180032 cannot be used for the UWB bandpass filter in which the wide passband width corresponding to the fractional band width of 40% is required.

Further, in the bandpass filter for the Low Band of UWB, because of the demand for the attenuation at the frequency of 5.3 GHz used in IEEE 802.11.a and at the frequency band of 6 GHz to 10.6 GHz used in the High Band of UWB, it is particularly necessary to secure the adequate attenuation on a high frequency side of the passband.

DISCLOSURE OF THE INVENTION

The present invention has been devised in view of the above-described problems in the conventional technique, and an object thereof is to provide a bandpass filter that can suitably be used as the bandpass filter for a Low Band of UWB and have an ultra-wide band, a suitable passband width, and an adequate attenuation in a blocking region and a radio communication module and a radio communication device using the same.

A bandpass filter of the present invention includes: a laminated body in which a plurality of dielectric layers are laminated; a first ground electrode that is disposed in a lower surface of the laminated body and connected to a ground potential; a second ground electrode that is disposed in an upper surface of the laminated body and connected to the ground potential; 2n+1 (n is a natural number) strip-shaped resonant electrodes that are horizontally disposed in a first interlayer of the laminated body such that one end of one resonant electrode and the other end of another resonant electrode are alternated, one end of one resonant electrode being connected to the ground potential to act as a quarter-wave resonator, electromagnetic field coupling being provided between the resonant electrodes; a strip-shaped input coupling electrode that is disposed in a second interlayer different from the first interlayer of the laminated body, the strip-shaped input coupling electrode facing at least a half of a region in a length direction of the input-stage resonant electrode in the 2n+1 resonant electrodes to provide the electromagnetic field coupling, the strip-shaped input coupling electrode having an electric signal input point into which an electric signal is inputted from an external circuit; a strip-shaped output coupling electrode that is disposed in the second interlayer of the laminated body, the strip-shaped output coupling electrode facing at least a half of a region in a length direction of the output-stage resonant electrode in the 2n+1 resonant electrodes to provide the electromagnetic field coupling, the strip-shaped output coupling electrode having an electric signal output point from which the electric signal is outputted to the external circuit; and an input/output coupling conductor that is disposed in a third interlayer located on a opposite side of the second interlayer of the laminated body from the first interlayer, the input/output coupling conductor including a strip-shaped input-side coupling portion, a strip-shaped output-side coupling portion, and a input/output connecting portion, the strip-shaped input-side coupling portion being located across the input coupling electrode from the input-stage resonant electrode to provide the electromagnetic field coupling while facing the input coupling electrode to provide the electromagnetic field coupling, the strip-shaped output-side coupling portion being located across the output coupling electrode from the output-stage resonant electrode to provide the electromagnetic field coupling while facing the output coupling electrode to provide the electromagnetic field coupling, the input/output connecting portion connecting the output-side coupling portion and the input-side coupling portion. The electric signal input point is located closer to the other end of the input-stage resonant electrode than a center in the length direction in a facing portion of the input coupling electrode to the input-stage resonant electrode, and the electric signal output point is located closer to the other end of the output-stage resonant electrode than a center in the length direction in a facing portion of the output coupling electrode to the output-stage resonant electrode.

The radio communication module according to the present invention includes the aforementioned bandpass filter.

The radio communication device according to the present invention includes: an RF unit that includes the aforementioned bandpass filter; a baseband unit that is connected to the RF unit; and an antenna that is connected to the RF unit.

BRIEF DESCRIPTION OF THE DRAWINGS

The above and other objects, features, and advantages of the present invention will be apparent from the following detailed description and drawings.

BEST MODES FOR CARRYING OUT THE INVENTION

A bandpass filter according to the present invention and a radio communication module and a radio communication device using the same will be described with reference to the accompanying drawings.

First Embodiment

Figure 1:
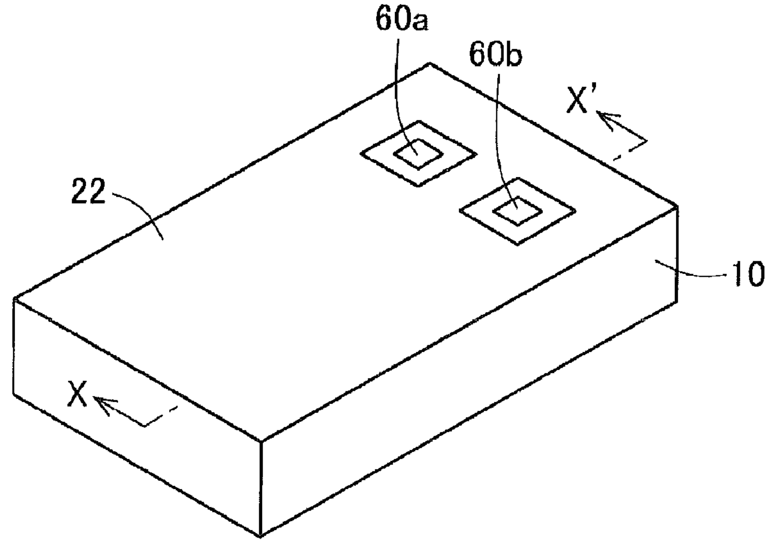
FIG. 1 is an appearance perspective view schematically illustrating a bandpass filter according to a first embodiment of the present invention.
Figure 2:
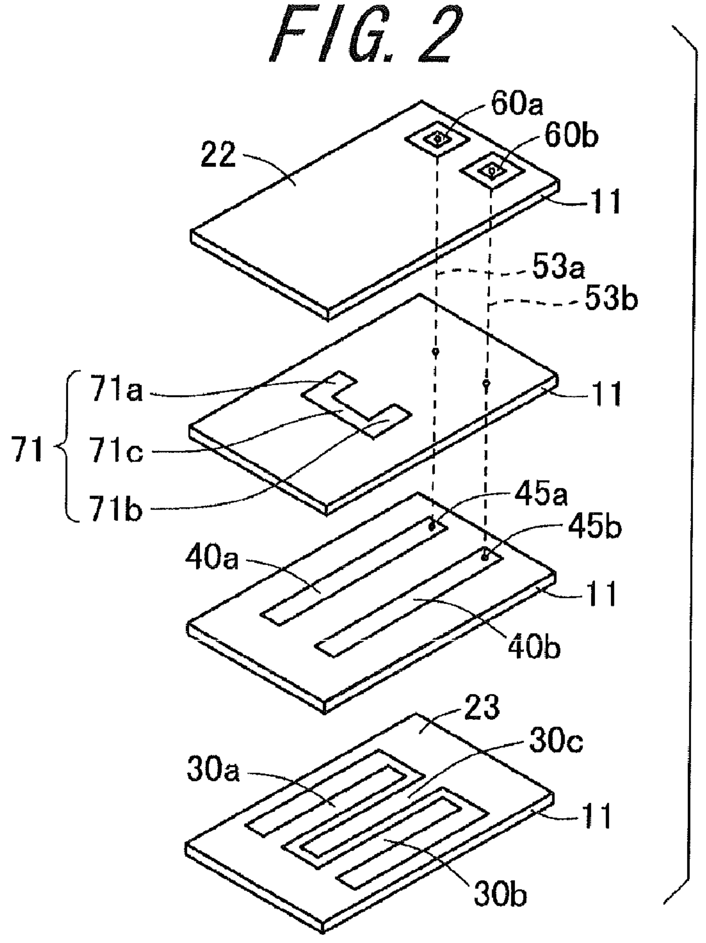
FIG. 2 is an exploded perspective view schematically illustrating the bandpass filter of FIG. 1.
Figure 3:
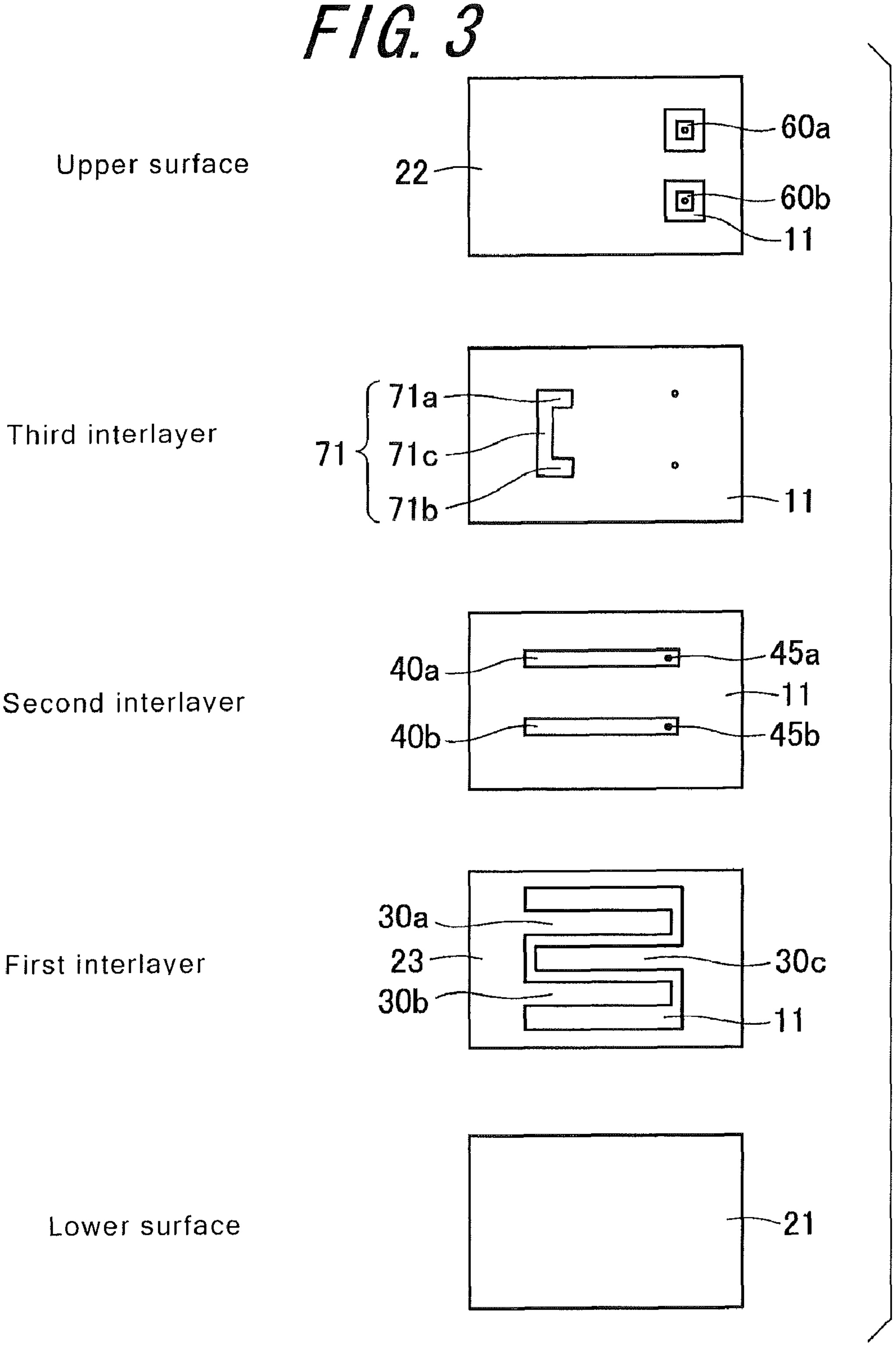
FIG. 3 is a plan view schematically illustrating upper and lower surfaces and an interlayer of the bandpass filter of FIG. 1.
Figure 4:
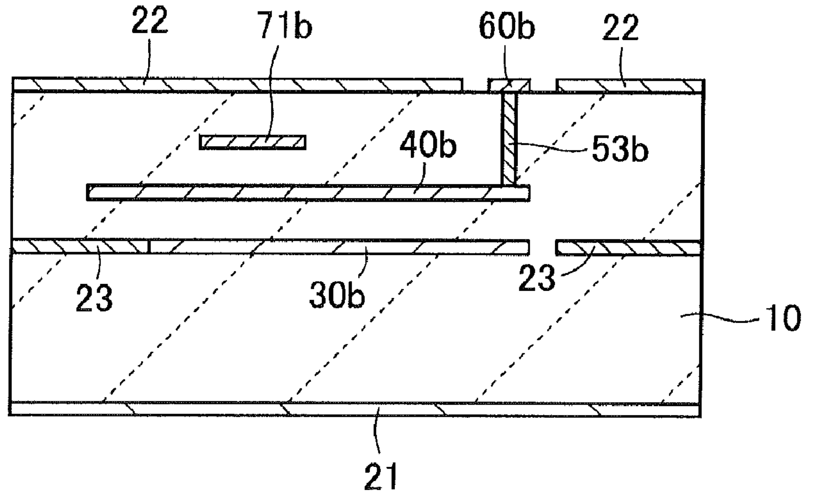
FIG. 4 is a sectional view taken along line X-X' of FIG. 1.

FIG. 1 is an appearance perspective view schematically illustrating a bandpass filter according to a first embodiment of the present invention. FIG. 2 is an exploded perspective view schematically illustrating the bandpass filter of FIG. 1. FIG. 3 is a plan view schematically illustrating upper and lower surfaces and an interlayer of the bandpass filter of FIG. 1. FIG. 4 is a sectional view taken along line X-X' of FIG. 1.

As illustrated in FIGS. 1 to 4, the bandpass filter of the present embodiment includes a laminated body 10, a first ground electrode 21, a second ground electrode 22, 2n+1 (n is a natural number, and n is three in the present embodiment) strip-shaped resonant electrodes 30*a*, 30*b*, and 30*c*, an annular ground electrode 23, a strip-shaped input coupling electrode 40*a*, a strip-shaped output coupling electrode 40*b*, and an input/output coupling conductor 71.

The laminated body 10 is formed by laminating a plurality of dielectric layers 11. The first ground electrode 21 is disposed in a lower surface of the laminated body 10, and is connected to a ground potential. The second ground electrode 22 is disposed in an upper surface of the laminated body 10, and is connected to the ground potential. The three resonant electrodes 30*a*, 30*b*, and 30*c* are horizontally disposed in a first interlayer of the laminated body 10 such that one end of each resonant electrode and the other end of another resonant electrode are alternated, and electromagnetic field coupling is provided between the resonant electrodes while one end of each resonant electrode is connected to the ground potential to act as a quarter-wave resonator. The annular ground electrode 23 is formed into an annular shape so as to surround the three resonant electrodes 30*a*, 30*b*, and 30*c* in the first interlayer of the laminated body 10. One end of each of the three resonant electrodes 30*a*, 30*b*, and 30*c* is connected to the annular ground electrode 23, and the annular ground electrode 23 is connected to the ground potential. The input coupling electrode 40*a* is disposed in a second interlayer that is different from the first interlayer of the laminated body 10. The input coupling electrode 40*a* faces at least a half of a region in a length direction of the input-stage resonant electrode 30*a* in the three resonant electrodes 30*a*, 30*b*, and 30*c* to provide the electromagnetic field coupling, and the input coupling electrode 40*a* includes an electric signal input point 45*a* into which an electric signal is inputted from an external circuit. The output coupling electrode 40*b* faces at least a half of a region in a length direction of the output-stage resonant electrode 30*b* in the three resonant electrodes 30*a*, 30*b*, and 30*c* to provide the electromagnetic field coupling, and the output coupling electrode 40*b* includes an electric signal output point 45*b* from which the electric signal is outputted to the external circuit. The input/output coupling conductor 71 is disposed in a third interlayer that is located on an opposite side of the second interlayer of the laminated body 10 from the first interlayer, and the input/output coupling conductor 71 includes a strip-shaped input-side coupling portion 71*a*, a strip-shaped output-side coupling portion 71*b*, and an input/output connecting portion 71*c*. The input-side coupling portion 71*a* is located across the input coupling electrode 40*a* from the input-stage resonant electrode 30*a* to provide the electromagnetic field coupling. The output-side coupling portion 71*b* is located across the output coupling electrode 40*b* from the output-stage resonant electrode 30*b* to provide the electromagnetic field coupling. The input/output connecting portion 71*c* connects the output-side coupling portion 71*b* and the input-side coupling portion 71*a*. In the input coupling electrode 40*a*, the electric signal input point 45*a* is located closer to the other end of the input-stage resonant electrode

30*a* than the center in the length direction in a facing portion of the input coupling electrode 40*a* to the input-stage resonant electrode 30*a*. In the output coupling electrode 40*b*, the electric signal output point 45*b* is located closer to the other end of the output-stage resonant electrode 30*b* than the center in the length direction in a facing portion of the output coupling electrode 40*b* to the output-stage resonant electrode 30*b*.

In the bandpass filter of the present embodiment, an input terminal electrode 60*a* and an output terminal electrode 60*b* are disposed in the upper surface of the laminated body 10 while isolated from the second ground electrode 22. The input terminal electrode 60*a* is connected to the electric signal input point 45*a* of the input coupling electrode 40*a* by an input-side penetrating conductor 53*a* penetrating the dielectric layer 11, and the output terminal electrode 60*b* is connected to the electric signal output point 45*b* of the output coupling electrode 40*b* through an output-side penetrating conductor 53*b* penetrating the dielectric layer 11.

In the bandpass filter of the present embodiment having the above-described configuration, the electric signal is inputted from the external circuit into the electric signal input point 45*a* of the input coupling electrode 40*a* through the input terminal electrode 60*a* and the input-side penetrating conductor 53*a*, thereby exciting the input-stage resonant electrode 30*a* that provides the electromagnetic field coupling to the input coupling electrode 40*a*. The electric signal is outputted to the external circuit from the electric signal output point 45*b* of the output coupling electrode 40*b*, which provides the electromagnetic field coupling to the output-stage resonant electrode 30*b* through the three resonant electrodes 30*a*, 30*b*, and 30*c* that mutually provide the electromagnetic field coupling, through the output-side penetrating conductor 53*b* and the output terminal electrode 60*b*. At this point, because the signal having a frequency at which the three resonant electrodes 30*a*, 30*b*, and 30*c* resonate is selectively passed through the bandpass filter of the present embodiment, the bandpass filter of the present embodiment acts as the bandpass filter that passes the signal having the specific frequency.

The first ground electrode 21 is disposed on the whole lower surface of the laminated body 10, and the second ground electrode 22 is disposed on the substantially whole upper surface of the laminated body 10 except for the surroundings of the input terminal electrode 60*a* and the output terminal electrode 60*b*. The first ground electrode 21 and the second ground electrode 22 are both connected to the ground potential, and the first ground electrode 21 and the second ground electrode 22 constitute a stripline resonator along with the resonant electrodes 30*a*, 30*b*, and 30*c*.

The strip-shaped resonant electrodes 30*a*, 30*b*, and 30*c* constitute the stripline resonator along with the first ground electrode 21 and the second ground electrode 22, and one end of each of the resonant electrodes 30*a*, 30*b*, and 30*c* is connected to the annular ground electrode 23 and connected to the ground potential, whereby the resonant electrodes 30*a*, 30*b*, and 30*c* act as the quarter-wave resonator. An electric length of each of the resonant electrodes 30*a*, 30*b*, and 30*c* is set to about a quarter of a wavelength at a center frequency of the bandpass filter.

The resonant electrodes 30*a*, 30*b*, and 30*c* are horizontally disposed in the first interlayer of the laminated body 10 while mutually providing edge coupling. The stronger coupling is obtained with decreasing interval among the resonant electrodes 30*a*, 30*b*, and 30*c*. However, since the resonant electrodes 30*a*, 30*b*, and 30*c* are difficult to produce when the interval decreases, for example, the interval is set to a range of about 0.05 to about 0.5 mm. In the resonant electrodes 30*a*, 30*b*, and 30*c*, one end of one resonant electrode and the other end of another resonant electrode are alternated to establish inter-digital type coupling, and the electric field coupling and the magnetic field coupling are added to establish the coupling stronger than comb-line type coupling. The resonant electrodes 30*a*, 30*b*, and 30*c* provide the inter-digital type coupling while mutually providing the edge coupling. Therefore, a frequency interval between the resonant frequencies in each resonant mode is suitable to obtain a wide passband width of about 40% in terms of fractional band width. The passband width of about 40% is much higher than the region realized by the conventional filter in which the quarter-wave resonator is used, and the passband width of about 40% is suitable to the UWB bandpass filter.

However, when the resonant electrodes 30*a*, 30*b*, and 30*c* provide the inter-digital type coupling while mutually providing the edge coupling, the coupling becomes excessively strong, and it is not preferable to realize the passband width of 40% in terms of fractional band width.

The annular ground electrode 23 is formed into the annular shape so as to surround the resonant electrodes 30*a*, 30*b*, and 30*c* in the first interlayer of the laminated body 10, and one end of each of the resonant electrodes 30*a*, 30*b*, and 30*c* is connected to the annular ground electrode 23. The annular ground electrode 23 is connected to the ground potential, whereby the annular ground electrode 23 has a function of connecting one end of each of the resonant electrodes 30*a*, 30*b*, and 30*c* to the ground potential. Even if the bandpass filter is formed in a partial region of a module board, one end of each of the resonant electrodes 30*a*, 30*b*, and 30*c* that are disposed into the inter-digital type is easily connected to the ground electrode by the existence of the annular ground electrode 23. Further, leaks of electromagnetic waves generated from the resonant electrodes 30*a*, 30*b*, and 30*c* to the surroundings can be reduced because the annular ground electrode 23 surrounds the resonant electrodes 30*a*, 30*b*, and 30*c*. This effect is particularly useful to prevent a bad influence on other regions of the module board when the bandpass filter is formed in a partial region of the module board.

The strip-shaped input coupling electrode 40*a* is disposed in the second interlayer different from the first interlayer, in which the resonant electrodes 30*a*, 30*b*, and 30*c* are disposed, such that the whole of the input coupling electrode 40*a* faces the input-stage resonant electrode 30*a* to provide the electromagnetic field coupling, and the input coupling electrode 40*a* faces at least a half of a region in the length direction of the input-stage resonant electrode 30*a*. Therefore, the input coupling electrode 40*a* and the input-stage resonant electrode 30*a* provide broadside coupling stronger than the edge coupling. The strip-shaped input coupling electrode 40*a* is connected to the input terminal electrode 60*a* by the input-side penetrating conductor 53*a*, and a connecting point of the input coupling electrode 40*a* and the input-side penetrating conductor 53*a* constitutes the electric signal input point 45*a* of the input coupling electrode 40*a*. The electric signal input point 45*a* is located in an end portion on the side closer to the other end of the input-stage resonant electrode 30*a* than the center in the length direction in the facing portion of the input coupling electrode 40*a* to the input-stage resonant electrode 30*a*, and an end portion on the opposite side is an open end. The electric signal inputted from the external circuit is supplied from the electric signal input point 45*a* to the input coupling electrode 40*a*. Therefore, the input coupling electrode 40*a* and the input-stage resonant electrode 30*a* provide the inter-digital type coupling, and the electric field coupling and the magnetic field coupling are added to establish the coupling stronger than the comb-line type coupling or capacitive coupling. The whole of the input coupling electrode 40*a* provides the broadside coupling to the input-stage resonant electrode 30*a*, and the whole of the input coupling electrode 40*a* provides the inter-digital type coupling to the input-stage resonant electrode 30*a*. Therefore, the input coupling electrode 40*a* is extremely strongly coupled to the input-stage resonant electrode 30*a*.

Similarly the strip-shaped output coupling electrode 40*b* is disposed in the second interlayer different from the first interlayer, in which the resonant electrodes 30*a*, 30*b*, and 30*c* are disposed, such that the whole of the output coupling electrode 40*b* faces the output-stage resonant electrode 30*b* to provide the electromagnetic field coupling, and the output coupling electrode 40*b* faces at least a half of a region in the length direction of the output-stage resonant electrode 30*b*. Therefore, the output coupling electrode 40*b* and the output-stage resonant electrode 30*b* provide the broadside coupling which is stronger than the edge coupling. The strip-shaped output coupling electrode 40*b* is connected to the output terminal electrode 60*b* by the output-side penetrating conductor 53*b*, and a connecting point of the output coupling electrode 40*b* and the output-side penetrating conductor 53*b* constitutes the electric signal output point 45*b* of the output coupling electrode 40*b*. The electric signal output point 45*b* is located in an end portion on the side closer to the other end of the output-stage resonant electrode 30*b* than the center in the length direction in the facing portion of the output coupling electrode 40*b* to the output-stage resonant electrode 30*b*, and an end portion on the opposite side is an open end. The electric signal is outputted to the external circuit from the electric signal output point 45*b* of the output coupling electrode 40*b* through the output-side penetrating conductor 53*b* and the output terminal electrode 60*b*. Therefore, the output coupling electrode 40*b* and the output-stage resonant electrode 30*b* provide the inter-digital type coupling, and the magnetic field coupling and the electric field coupling are added to establish the coupling stronger than the comb-line type coupling or the capacitive coupling. The whole of the output coupling electrode 40*b* provides the broadside coupling to the output-stage resonant electrode 30*b*, and the whole of the output coupling electrode 40*b* provides the inter-digital type coupling to the output-stage resonant electrode 30*b*. Therefore, the output coupling electrode 40*b* is extremely strongly coupled to the output-stage resonant electrode 30*b*.

Thus, the input coupling electrode 40*a* is extremely strongly coupled to the input-stage resonant electrode 30*a*, and the output coupling electrode 40*b* is extremely strongly coupled to the output-stage resonant electrode 30*b*. The bandpass filter having the flat, low-loss passband characteristic in the whole region of the wide passband can be obtained in the present embodiment of the invention. In the bandpass filter of the present embodiment, an insertion loss does not largely increase at a frequency located between the resonant frequencies in each mode even in the wide passband far exceeding the region that can be realized by the conventional filter in which the quarter-wave resonator is used.

Preferably dimensions of the input coupling electrode 40*a* and the output coupling electrode 40*b* are equally set to those of the input-stage resonant electrode 30*a* and the output-stage resonant electrode 30*b*. The stronger coupling is obtained as the interval between the input coupling electrode 40*a* and the input-stage resonant electrode 30*a* and the interval between the output coupling electrode 40*b* and the output-stage resonant electrode 30*b* increase. However, because the input coupling electrode 40*a*, the input-stage resonant electrode 30*a*, the input coupling electrode 40*a*, and the input-stage resonant electrode 30*a* are difficult to produce when the interval decreases, for example, the interval is set to a range of about 0.01 to about 0.5 mm.

As described above, the bandpass filter of the present embodiment has the flat, low-loss passband characteristic in the whole region of the extremely wide passband of 40% in terms of fractional band width, which far exceeds the region that can be realized by the conventional filter in which the quarter-wave resonator is used, and the adequate attenuation is secured on the high frequency side of the passband in the bandpass filter of the present embodiment. Accordingly, in the present embodiment, the high-performance bandpass filter suitably used as the UWB filter can be obtained.

The bandpass filter of the present embodiment includes the input/output coupling conductor 71 disposed in the third interlayer that is located on the opposite side of the second interlayer of the laminated body 10 from the first interlayer, and the input/output coupling conductor 71 includes the strip-shaped input-side coupling portion 71*a*, the strip-shaped output-side coupling portion 71*b*, and the input/output connecting portion 71*c*. The input-side coupling portion 71*a* is located across the input coupling electrode 40*a* from the input-stage resonant electrode 30*a* to provide the electromagnetic field coupling. The output-side coupling portion 71*b* is located across the output coupling electrode 40*b* from the output-stage resonant electrode 30*b* to provide the electromagnetic field coupling. The input/output connecting portion 71*c* connects the output-side coupling portion 71*b* and the input-side coupling portion 71*a*. With this configuration, the electromagnetic field coupling between the input-side coupling portion 71*a* of the input/output coupling conductor 71 and the input-stage resonant electrode 30*a* is generated mainly by the magnetic field, and the electromagnetic field coupling between the output-side coupling portion 71*b* of the input/output coupling conductor 71 and the output-stage resonant electrode 30*b* is generated mainly by the magnetic field. Therefore, the electromagnetic field coupling between the input-stage resonant electrode 30*a* and the output-stage resonant electrode 30*b* is generated mainly by the magnetic field through the input/output coupling conductor 71. On the other hand, the resonant electrodes adjacent to each other provide the inter-digital type coupling, and the magnetic field coupling and the electric field coupling are added to establish the strong coupling. However, and electromagnetic field coupling is mainly generated by the electric field as a whole. Therefore, a phase difference of 180° is generated between the signal that is transmitted between the input-stage resonant electrode 30*a* and the output-stage resonant electrode 30*b* by the electromagnetic field coupling generated mainly by the magnetic field through the input/output coupling conductor 71 and the signal that is transmitted between the resonant electrodes adjacent to each other by the electromagnetic field coupling generated mainly by the electric field, thereby generating a phenomenon in which the signals cancel each other. Since the phenomenon can be generated on the high frequency side near the passband, an attenuation pole in which the signal is hardly transmitted can be formed on the high frequency side near the passband in the passband characteristic of the bandpass filter.

Further, the bandpass filter of the present embodiment includes the input/output coupling conductor 71 disposed in the third interlayer that is located on the opposite side of the second interlayer of the laminated body 10 from the first interlayer, and the input/output coupling conductor 71 includes the strip-shaped input-side coupling portion 71*a*, the strip-shaped output-side coupling portion 71*b*, and the input/output connecting portion 71*c*. The input-side coupling portion 71*a* faces the input coupling electrode 40*a* to provide the electromagnetic field coupling. The output-side coupling portion 71*b* faces the output coupling electrode 40*b* to provide the electromagnetic field coupling. The input/output connecting portion 71*c* connects the output-side coupling portion 71*b* and the input-side coupling portion 71*a*. With this configuration, the electromagnetic field coupling between the input-side coupling portion 71*a* of the input/output coupling conductor 71 and the input coupling electrode 40*a* is generated mainly by the electric field, and the electromagnetic field coupling between the output-side coupling portion 71*b* of the input/output coupling conductor 71 and the output coupling electrode 40*b* is generated mainly by the electric field. Therefore, the electromagnetic field coupling between the input coupling electrode 40*a* and the output coupling electrode 40*b* is generated mainly by the electric field through the input/output coupling conductor 71. On the other hand, as described above, the electromagnetic field coupling between the input-stage resonant electrode 30*a* and the output-stage resonant electrode 30*b* exists mainly by the magnetic field through the input/output coupling conductor 71, the electromagnetic field coupling is generated between the input-stage resonant electrode 30*a* and the input coupling electrode 40*a*, and the electromagnetic field coupling is generated between the output-stage resonant electrode 30*b* and the output coupling electrode 40*b*. Therefore, the electromagnetic field coupling between the input coupling electrode 40*a* and the output coupling electrode 40*b* exists mainly by the magnetic field from the input coupling electrode 40*a* to the output coupling electrode 40*b* through the input-stage resonant electrode 30*a*, the input/output coupling conductor 71, and the output-stage resonant electrode 30*b*. Therefore, the phase difference of 180° is generated between the signal that is transmitted between the input coupling electrode 40*a* and the output coupling electrode 40*b* by the electromagnetic field coupling generated mainly by the electric field through the input/output coupling conductor 71 and the signal that is transmitted from the input coupling electrode 40*a* to the output coupling electrode 40*b* through the input-stage resonant electrode 30*a*, the input/output coupling conductor 71, and the output-stage resonant electrode 30*b* by the electromagnetic field coupling generated mainly by the magnetic field, thereby generating the phenomenon in which the signals cancel each other. Since the phenomenon can be generated on the low frequency side and the high frequency side of the passband, the attenuation poles in which the signal is hardly transmitted can be formed on the low frequency side and the high frequency side of the passband in the passband characteristic of the bandpass filter.

As described above, the bandpass filter of the present embodiment has the one attenuation pole on the low frequency side of the passband and two attenuation poles on the high frequency side of the passband in the passband characteristic. Accordingly, the bandpass filter having the excellent attenuation characteristic outside the passband can be obtained.

In order to form the one attenuation pole on the low frequency side of the passband and the two attenuation poles on the high frequency side of the passband in the passband characteristic, it is necessary that the number of resonant electrodes be 2n+1 (n is a natural number), i.e., an odd number of three or more. For the even-numbered resonant electrodes, it is difficult that the adequately strong electromagnetic field coupling between the input-stage resonant electrode and the output-stage resonant electrode is generated mainly by the magnetic field using the input/output coupling conductor. Therefore, the one attenuation pole on the low frequency side of the passband and the two attenuation poles on the high frequency side of the passband cannot be formed in the passband characteristic. When the number of resonant electrodes increases excessively, the bandpass filter is enlarged while the loss increases in the passband, the number of resonant electrodes is set to about ten or less from a practical standpoint.

In the bandpass filter of the first embodiment, the input/output connecting portion 71*c* of the input/output coupling conductor 71 connects the side that is farther away from the electric signal input point 45*a* of the input coupling electrode 40*a* than the center in the length direction of the input-side coupling portion 71*a* and the side that is farther away from the electric signal output point 45*b* of the output coupling electrode 40*b* than the center in the length direction of the output-side coupling portion 71*b*. Therefore, since the input-side coupling portion 71*a* and the input coupling electrode 40*a* provide the inter-digital type coupling while the output-side coupling portion 71*b* and the output coupling electrode 40*b* provide the inter-digital type coupling, the input/output coupling conductor 71 and each of the input coupling electrode 40*a* and the output coupling electrode 40*b* strongly provide the inter-digital type electromagnetic field coupling. Additionally, because the input-side coupling portion 71*a* and the input-stage resonant electrode 30*a* provide the comb-line type coupling while the output-side coupling portion 71*b* and the output-stage resonant electrode 30*b* provide the comb-line type coupling, the input/output coupling conductor 71 and each of the input-stage resonant electrode 30*a* and the output-stage resonant electrode 30*b* provide the relatively weak comb-line type electromagnetic field coupling, and the frequency of the attenuation pole generated on the high frequency side near the passband becomes high. Therefore, the attenuation can increase on the high frequency side of the passband in the frequency region that is far away from the passband.

In the bandpass filter of the present embodiment, in the input/output coupling conductor 71, the input-side coupling portion 71*a* is disposed such that the length direction of the input-side coupling portion 71*a* becomes in parallel with the length directions of the input coupling electrode 40*a* and the input-stage resonant electrode 30*a*. The output-side coupling portion 71*b* is disposed such that the length direction of the output-side coupling portion 71*b* becomes in parallel with the length directions of the output coupling electrode 40*b* and the output-stage resonant electrode 30*b*. The input/output connecting portion 71*c* is disposed such that the length direction of the input/output connecting portion 71*c* is orthogonal to the length directions of the resonant electrodes 30*a*, 30*b*, and 30*c* when viewed from above. With this configuration, the electromagnetic field coupling between the input-side coupling portion 71*a* and each of the input coupling electrode 40*a* and the input-stage resonant electrode 30*a* becomes stronger, the electromagnetic field coupling between the output-side coupling portion 71*b* and each of the output coupling electrode 40*b* and the output-stage resonant electrode 30*b* becomes stronger, and the electromagnetic field coupling between the input/output connecting portion 71*c* and each of the resonant electrodes 30*a* and 30*b*, and 30*c* becomes weaker. Therefore, the electromagnetic field coupling between the input coupling electrode 40*a* and the output coupling electrode 40*b* through the input/output coupling conductor 71 and the electromagnetic field coupling between the input-stage resonant electrode 30*a* and the output-stage resonant electrode 30*b* through the input/output coupling conductor 71 can be strengthened, and the electric characteristic degradation caused by the unnecessary electromagnetic field coupling between the input/output coupling conductor 71 and each of the resonant electrodes 30*a*, 30*b*, and 30*c* can be prevented.

In the input/output coupling conductor 71, for example, widths of the input-side coupling portion 71*a* and the output-side coupling portion 71*b* are set equal to or lower than those of the input coupling electrode 40*a* and the output coupling electrode 40*b*, and a width of the input/output connecting portion 71*c* is set narrower than the widths of the input-side coupling portion 71*a* and the output-side coupling portion 71*b*. Lengths of the input-side coupling portion 71*a* and the output-side coupling portion 71*b* are appropriately set according to magnitude of the electromagnetic field coupling to be generated among the input coupling electrode 40*a*, the output coupling electrode 40*b*, the input-stage resonant electrode 30*a*, and the output-stage resonant electrode 30*b*. Desirably an interval between the input/output coupling conductor 71 and each of the input coupling electrode 40*a* and the output coupling electrode 40*b* is small because the stronger coupling is obtained with decreasing interval. However, since the input/output coupling conductor 71, the input coupling electrode 40*a*, and the output coupling electrode 40*b* are difficult to produce when the interval decreases, for example, the interval is set to the range of about 0.01 to about 0.5 mm.

Second Embodiment

Figure 5:
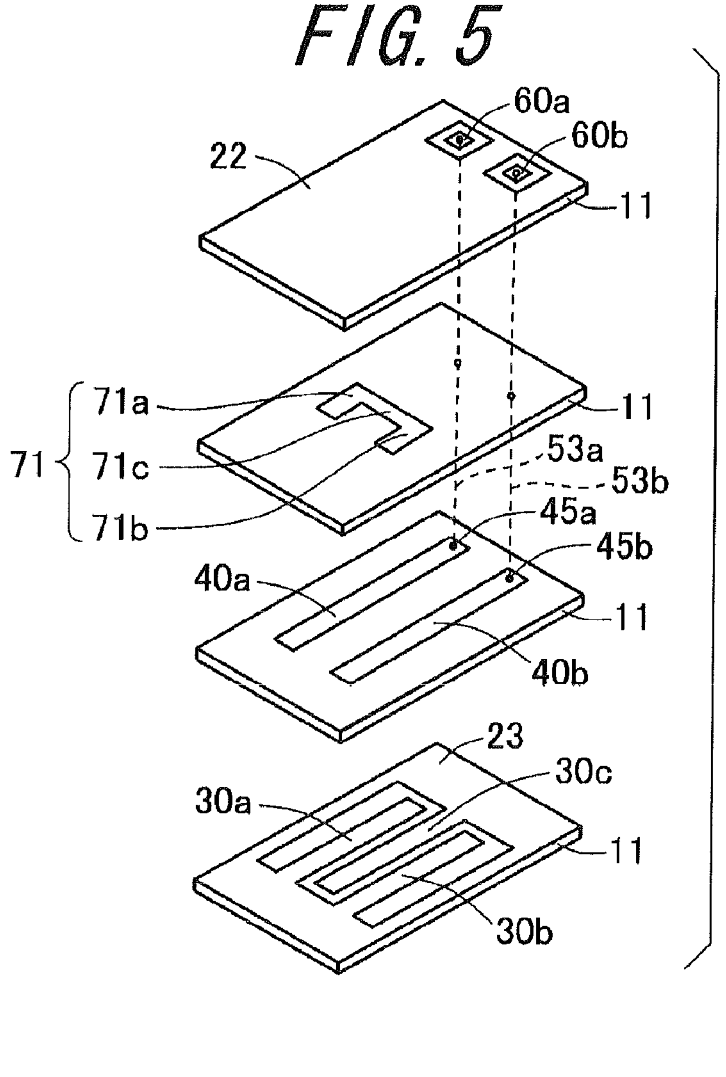
FIG. 5 is an exploded perspective view schematically illustrating a bandpass filter according to a second embodiment of the present invention.

FIG. 5 is an exploded perspective view schematically illustrating a bandpass filter according to a second embodiment of the present invention. In the present embodiment, only the point different from the first embodiment is described, and the similar component is designated by the same reference numeral to omit the overlapping description.

In the bandpass filter of the present embodiment, the input/output connecting portion 71 connects the side that is closer to the electric signal input point 45*a* of the input coupling electrode 40*a* than the center in the length direction of the input-side coupling portion 71*a* and the side that is closer to the electric signal output point 45*b* of the output coupling electrode 40*b* than the center in the length direction of the output-side coupling portion 71*b*.

In the bandpass filter of the present embodiment, the input/output connecting portion 71*c* of the input/output coupling conductor 71 connects the side that is closer to the electric signal input point 45*a* of the input coupling electrode 40*a* than the center in the length direction of the input-side coupling portion 71*a* and the side that is closer to the electric signal output point 45*b* of the output coupling electrode 40*b* than the center in the length direction of the output-side coupling portion 71*b*. Therefore, because the input-side coupling portion 71*a* and the input coupling electrode 40*a* provide the comb-line type coupling while the output-side coupling portion 71*b* and the output coupling electrode 40*b* provide the comb-line type coupling, the input/output coupling conductor 71 and each of the input coupling electrode 40*a* and the output coupling electrode 40*b* provides the relatively weak comb-line type electromagnetic field coupling. Additionally, because the input-side coupling portion 71*a* and the input-stage resonant electrode 30*a* provide the inter-digital type coupling while the output-side coupling portion 71*b* and the output-stage resonant electrode 30*b* provide the inter-digital type coupling, the input/output coupling conductor 71 and each of the input-stage resonant electrode 30*a* and the output-stage resonant electrode 30*b* provide the strong inter-digital type electromagnetic field coupling, and the frequency of the attenuation pole generated on the high frequency side near the passband is lowered. Therefore, the attenuation can increase on the high frequency side of the passband in the frequency region near the passband.

Third Embodiment

Figure 6:
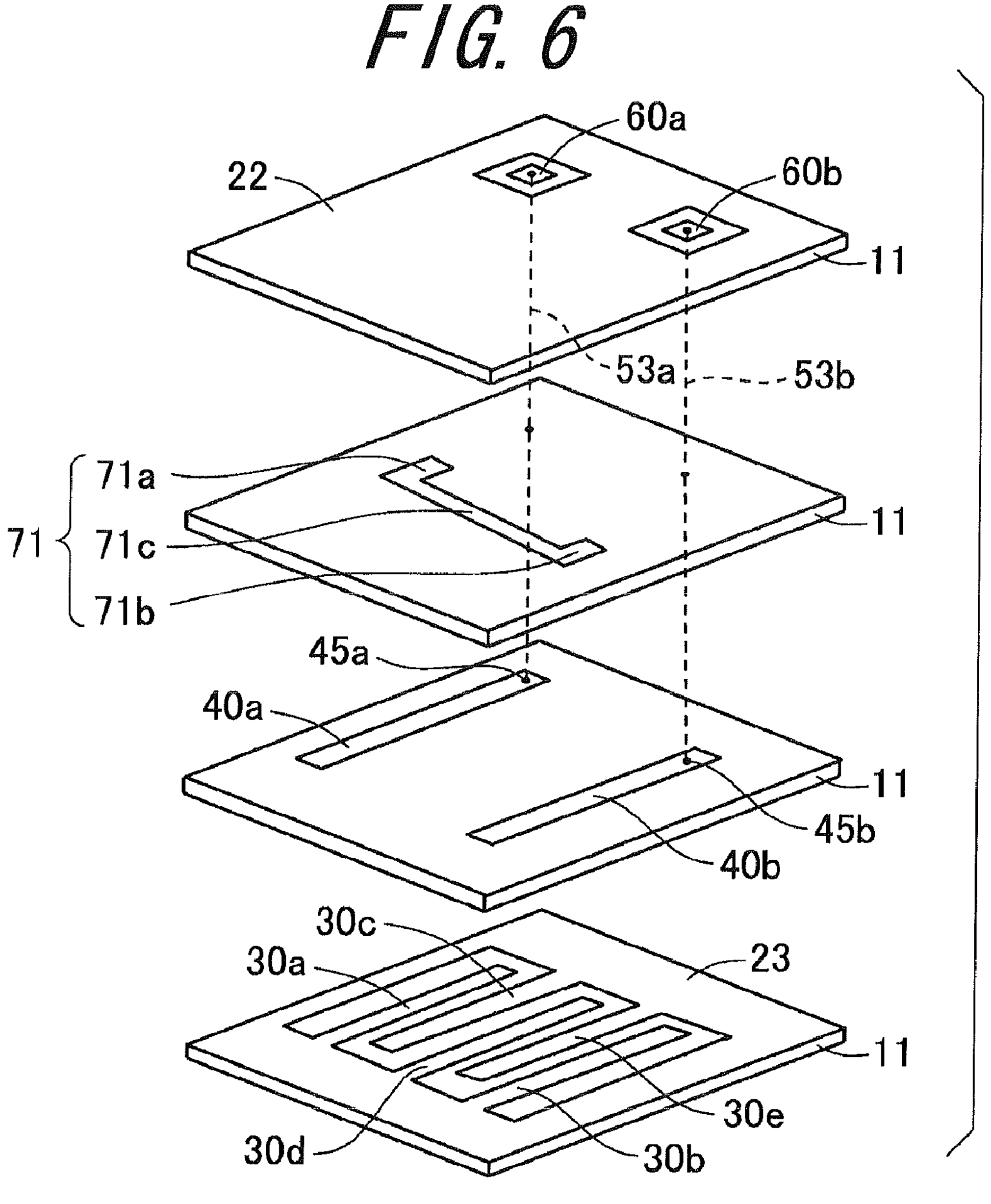
FIG. 6 is an exploded perspective view schematically illustrating a bandpass filter according to a third embodiment of the present invention.

FIG. 6 is an exploded perspective view schematically illustrating a bandpass filter according to a third embodiment of the present invention. In the present embodiment, only the point different from the first and second embodiments is described, and the similar component is designated by the same reference numeral to omit the overlapping description.

The bandpass filter of the present embodiment includes five strip-shaped resonant electrodes 30*a*, 30*b*, 30*c*, 30*d*, and 30*e*. The five resonant electrodes 30*a*, 30*b*, 30*c*, 30*d*, and 30*e* are horizontally disposed in the first interlayer of the laminated body 10 such that one end of each resonant electrode and the other end of another resonant electrode are alternated, and electromagnetic field coupling is provided among the five resonant electrodes 30*a*, 30*b*, 30*c*, 30*d*, and 30*e* while one end of each the five resonant electrodes 30*a*, 30*b*, 30*c*, 30*d*, and 30*e* is connected to the ground potential to act as the quarter-wave resonator. As with the bandpass filter of the first and second embodiments, in the bandpass filter of the present embodiment, the passband characteristic has the wide, low-loss passband, the one attenuation pole on the low frequency side of the passband and two attenuation poles on the high frequency side of the passband, and the attenuation range where adequate attenuation is secured in the wide frequency range. Accordingly, in the bandpass filter of the present embodiment, the excellent attenuation characteristic can be obtained.

Fourth Embodiment

Figure 7:
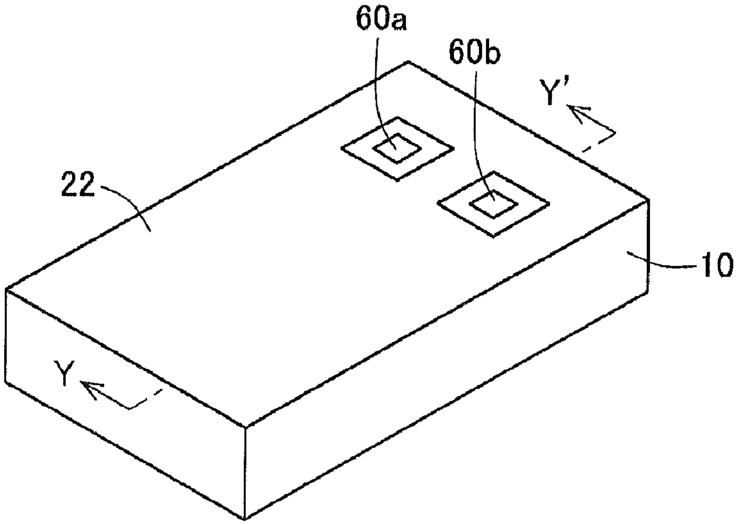
FIG. 7 is an appearance perspective view schematically illustrating a bandpass filter according to a fourth embodiment of the present invention.
Figure 8:
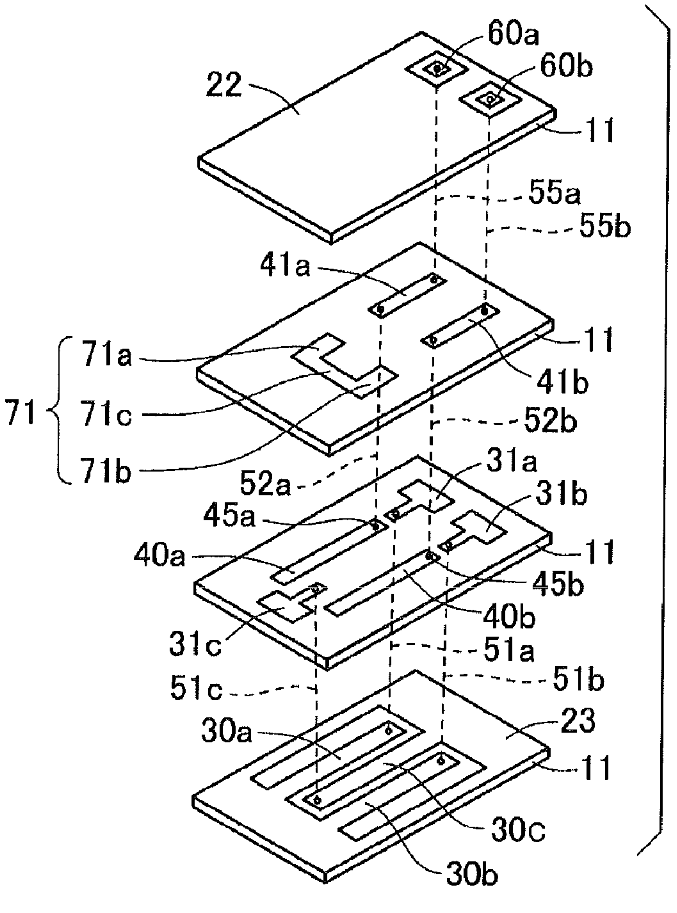
FIG. 8 is an exploded perspective view schematically illustrating the bandpass filter of FIG. 7.
Figure 9:
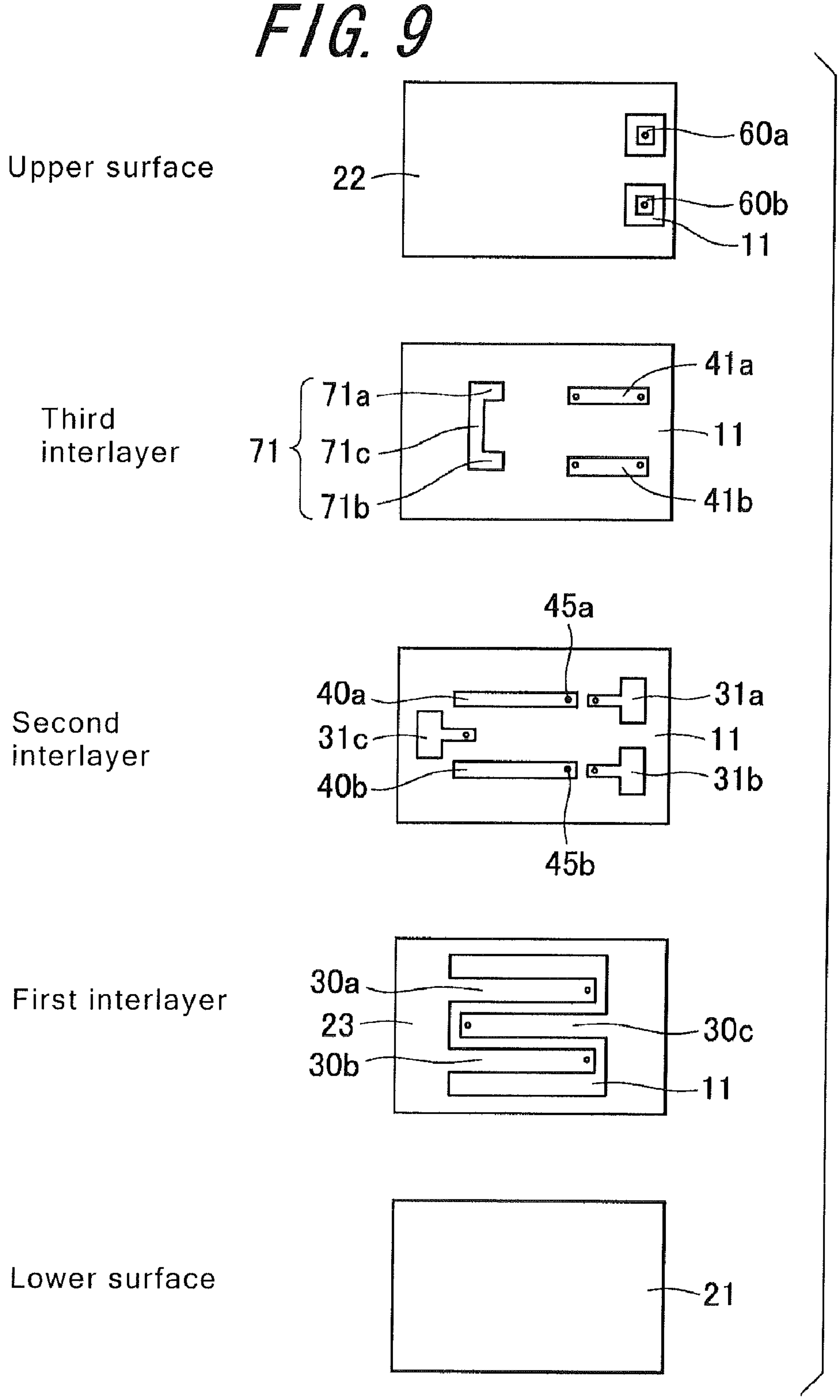
FIG. 9 is a plan view schematically illustrating upper and lower surfaces and an interlayer of the bandpass filter of FIG. 7.
Figure 10:
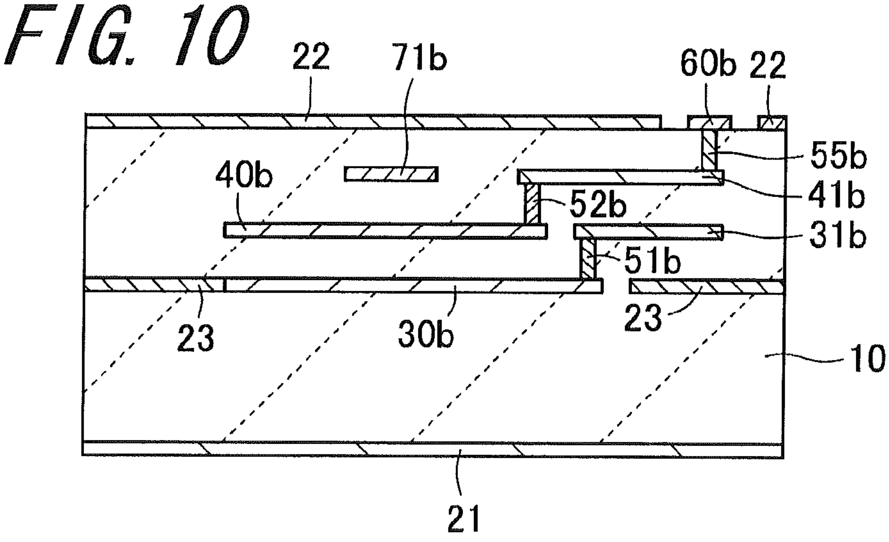
FIG. 10 is a sectional view taken along line Y-Y' of FIG. 7.

FIG. 7 is an appearance perspective view schematically illustrating a bandpass filter according to a fourth embodiment of the present invention. FIG. 8 is an exploded perspective view schematically illustrating the bandpass filter of FIG. 7. FIG. 9 is a plan view schematically illustrating upper and lower surfaces and an interlayer of the bandpass filter of FIG. 7. FIG. 10 is a sectional view taken along line Y-Y' of FIG. 7. In the present embodiment, only the point different from the first embodiment is described, and the similar component is designated by the same reference numeral to omit the overlapping description.

In the bandpass filter of the present embodiment, auxiliary resonant electrodes 31*a*, 31*b*, and 31*c* are disposed according to the three resonant electrodes 30*a*, 30*b*, and 30*c*, respectively. The auxiliary resonant electrodes 31*a*, 31*b*, and 31*c* are disposed in an interlayer different from the first interlayer of the laminated body 10 so as to have a region facing the annular ground electrode 23 and a region facing the resonant electrodes 30*a*, 30*b*, and 30*c*. The auxiliary resonant electrodes 31*a*, 31*b*, and 31*c* are connected to the other end side of each of the resonant electrodes 30*a*, 30*b*, and 30*c* by first penetrating conductors 51*a*, 51*b*, and 51*c*, and the first penetrating conductors 51*a*, 51*b*, and 51*c* penetrate the dielectric layer 11 located between the resonant electrodes 30*a*, 30*b*, and 30*c* and the region facing the resonant electrodes 30*a*, 30*b*, and 30*c*.

The bandpass filter of the present embodiment includes an auxiliary input coupling electrode 41*a* and an auxiliary output coupling electrode 41*b*. The auxiliary input coupling electrode 41*a* is disposed in the third interlayer different from the first interlayer and the second interlayer of the laminated body 10 and the interlayer in which the auxiliary resonant electrode 31*a* is disposed. The auxiliary input coupling electrode 41*a* is disposed so as to have a region facing the input coupling electrode 40*a* and a region facing the auxiliary resonant electrode 31*a* that is connected to the input-stage resonant electrode 30*a* in the auxiliary resonant electrodes 31*a*, 31*b*, and 31*c*. The auxiliary input coupling electrode 41*a* is connected to the side closer to the other end of the input-stage resonant electrode 30*a* than the center in the length direction in the facing portion of the input coupling electrode 40*a* to the input-stage resonant electrode 30*a* by a second penetrating conductor 52*a*, and the second penetrating conductor 52*a* penetrates the dielectric layer 11 located between the input coupling electrode 40*a* and the region facing the input coupling electrode 40*a*. The auxiliary output coupling electrode 41*b* is disposed in the interlayer different from the first interlayer and the second interlayer of the laminated body 10 and the interlayer in which the auxiliary resonant electrode 31*b* is disposed. The auxiliary output coupling electrode 41*b* is disposed so as to have a region facing the output coupling electrode 40*b* and a region facing the auxiliary resonant electrode 31*b* that is connected to the output-stage resonant electrode 30*b* in the auxiliary resonant electrodes 31*a*, 31*b*, and 31*c*. The auxiliary output coupling electrode 41*b* is connected to the side closer to the other end of the output-stage resonant electrode 30*b* than the center in the length direction in the facing portion of the output coupling electrode 40*b* to the output-stage resonant electrode 30*b* by a third penetrating conductor 52*b*, and the third penetrating conductor 52*b* penetrates the dielectric layer 11 located between the output coupling electrode 40*b* and the region facing the output coupling electrode 40*b*.

The auxiliary resonant electrodes 31*a*, 31*b*, and 31*c* are disposed in the second interlayer of the laminated body 10 so as to have the region facing each of the resonant electrodes 30*a*, 30*b*, and 30*c* and the region facing the annular ground electrode 23. Each of the auxiliary resonant electrodes 31*a*, 31*b*, and 31*c* are connected to the other end side of each of the resonant electrodes 30*a*, 30*b*, and 30*c* by each of the first penetrating conductors 51*a*, 51*b*, and 51*c*, and the first penetrating conductor 51*a*, 51*b*, and 51*c* penetrate the dielectric layer 11 located between the resonant electrodes 30*a*, 30*b*, and 30*c* and the region facing the resonant electrodes 30*a*, 30*b*, and 30*c* of the auxiliary resonant electrodes 31*a*, 31*b*, and 31*c*. At this point, in the region where the auxiliary resonant electrodes 31*a*, 31*b*, and 31*c* face the annular ground electrode 23, an electrostatic capacitance is generated between the auxiliary resonant electrodes 31*a*, 31*b*, and 31*c* and the annular ground electrode 23, which allows the lengths of the resonant electrodes 30*a*, 30*b*, and 30*c* to be shortened. Therefore, the compact bandpass filter can be obtained.

Each of the auxiliary resonant electrodes 31*a*, 31*b*, and 31*c* is connected to the other end of each of the resonant electrodes 30*a*, 30*b*, and 30*c*, and each of the auxiliary resonant electrodes 31*a*, 31*b*, and 31*c* is extended therefrom toward the side opposite to one end of each of the resonant electrodes 30*a*, 30*b*, and 30*c*. Therefore, as described later, a coupling body of the input-stage resonant electrode 30*a* and the auxiliary resonant electrode 31*a* connected thereto and a coupling body of the input coupling electrode 40*a* and the auxiliary input coupling electrode 41*a* connected thereto provide the broadside coupling as a whole, and the coupling bodies also provide the strong inter-digital type coupling, which allows the extremely strong coupling to be generated. Similarly, a coupling body of the output-stage resonant electrode 30*b* and the auxiliary resonant electrode 31*b* connected thereto and a coupling body of the output coupling electrode 40*b* and auxiliary output coupling electrode 41*b* connected thereto provide the broadside coupling as a whole, and the coupling bodies also provide the strong inter-digital type coupling, which allows the extremely strong coupling to be generated.

For example, an area of the portion in which the auxiliary resonant electrodes 31*a*, 31*b*, and 31*c* face the annular ground electrode 23 is set to a range of about 0.01 to about 3 $mm^2$ in consideration of a balance between the necessary size and the obtained electrostatic capacitance. Desirably an interval between the auxiliary resonant electrodes 31*a*, 31*b*, and 31*c* and the annular ground electrode 23 is small because the stronger coupling is obtained with decreasing interval. However, because the auxiliary resonant electrodes 31*a*, 31*b*, and 31*c* and the annular ground electrode 23 are difficult to produce when the interval decreases, for example, the interval is set to the range of about 0.01 to about 0.5 mm.

The strip-shaped auxiliary input coupling electrode 41*a* is disposed in the third interlayer different from the first interlayer and the second interlayer of the laminated body 10 and the interlayer in which the auxiliary resonant electrode 31*a* is disposed, and the auxiliary input coupling electrode 41*a* is disposed so as to have the region facing the input coupling electrode 40*a* and the region facing the auxiliary resonant electrode 31*a* that is connected to the input-stage resonant electrode 30*a*. The auxiliary input coupling electrode 41*a* is connected to the input coupling electrode 40*a* by the second penetrating conductor 52*a*, and the second penetrating conductor 52*a* penetrates the dielectric layer 11 located between the input coupling electrode 40*a* and the region facing the input coupling electrode 40*a*. Therefore, the auxiliary input coupling electrode 41*a* connected to the input coupling electrode 40*a* and the auxiliary resonant electrode 31*a* connected to the input-stage resonant electrode 30*a* provide the broadside coupling, and the broadside coupling is added to the coupling between the input coupling electrode 40*a* and the input-stage resonant electrode 30*a*, thereby generating the stronger coupling as a whole.

Further, the end portion opposite to the side connected to the second penetrating conductor 52*a* in the length direction of the auxiliary input coupling electrode 41*a* is connected to the input terminal electrode 60*a*, which is disposed in the upper surface of the laminated body 10, by the input-side penetrating conductor 55*a*. Therefore, the coupling body of the input-stage resonant electrode 30*a* and the auxiliary resonant electrode 31*a* connected thereto and the coupling body of the input coupling electrode 40*a* and the auxiliary input coupling electrode 41*a* connected thereto provide the inter-digital type coupling as a whole, whereby the magnetic field coupling and the electric field coupling are added to obtain the strong coupling. Accordingly, in the length direction of the auxiliary input coupling electrode 41*a*, compared with the case connected to the input terminal electrode 60*a*, the stronger coupling can be realized on the same side as that connected to the input coupling electrode 40*a*. In the bandpass filter of the present embodiment, the electric signal is inputted from the external circuit into the input coupling electrode 40*a* through the input terminal electrode 60*a*, the input-side penetrating conductor 55*a*, the auxiliary input coupling electrode 41*a*, and the second penetrating conductor 52*a*. Therefore, the connecting point of the input coupling electrode 40*a* and the second penetrating conductor 52*a* constitutes the electric signal input point 45*a* of the input coupling electrode 40*a*.

The auxiliary output coupling electrode 41*b* is disposed in the third interlayer different from the first interlayer and the second interlayer of the laminated body 10 and the interlayer in which the auxiliary resonant electrode 31*b* is disposed, and the auxiliary output coupling electrode 41*b* is disposed so as to have the region facing the output coupling electrode 40*b* and the region facing the auxiliary resonant electrode 31*b* that is connected to the output-stage resonant electrode 30*b*. The auxiliary output coupling electrode 41*b* is connected to the output coupling electrode 40*b* by the third penetrating conductor 52*b*, and the third penetrating conductor 52*b* penetrates the dielectric layer 11 located between the output coupling electrode 40*b* and the region facing the output coupling electrode 40*b*. Therefore, the auxiliary output coupling electrode 41*b* connected to the output coupling electrode 40*b* and the auxiliary resonant electrode 31*b* connected to the output-stage resonant electrode 30*b* provide the broadside coupling, and the broadside coupling is added to the coupling between the output coupling electrode 40*b* and the output-stage resonant electrode 30*b*, thereby generating the stronger coupling as a whole.

Further, the end portion opposite to the side connected to the third penetrating conductor 52*b* in the length direction of the auxiliary output coupling electrode 41*b* is connected to the output terminal electrode 60*b*, which is disposed in the upper surface of the laminated body 10, by the output-side penetrating conductor 55*b*. Therefore, the coupling body of the output-stage resonant electrode 30*b* and the auxiliary resonant electrode 31*b* connected thereto and the coupling body of the output coupling electrode 40*b* and the auxiliary input coupling electrode 41*b* connected thereto provide the inter-digital type coupling as a whole, whereby the magnetic field coupling and the electric field coupling are added to obtain the strong coupling. Accordingly, in the length direction of the auxiliary output coupling electrode 41*b*, compared with the case connected to the output terminal electrode 60*b*, the stronger coupling can be realized on the same side as that connected to the output coupling electrode 40*b*. In the bandpass filter of the present embodiment, the electric signal is outputted to the external circuit from the output coupling electrode 40*b* through the third penetrating conductor 52*b*, the auxiliary output coupling electrode 41*b*, the output-side penetrating conductor 55*b*, and the output terminal electrode 60*b*. Therefore, the connecting point of the output coupling electrode 40*b* and the third penetrating conductor 52*b* constitutes the electric signal output point 45*b* of the output coupling electrode 40*b*.

As described above, the coupling body of the input-stage resonant electrode 30*a* and the auxiliary resonant electrode 31*a* connected thereto and the coupling body of the input coupling electrode 40*a* and the auxiliary input coupling electrode 41*a* connected thereto provide the broadside coupling as a whole, and the coupling bodies provide the inter-digital type coupling, whereby the extremely strong coupling is obtained. Similarly, the coupling body of the output-stage resonant electrode 30*b* and the auxiliary resonant electrode 31*b* connected thereto and the coupling body of the output coupling electrode 40*b* and the auxiliary input coupling electrode 41*b* connected thereto provide the broadside coupling as a whole, and the coupling bodies provide the inter-digital type coupling, whereby the extremely strong coupling is obtained. Therefore, the increase in insertion loss at the frequency between the resonant frequencies in each resonant mode is further reduced even in the extremely wide band, and the bandpass filter having the flat, low-loss passband characteristic in the whole region of the wide passband can be obtained.

Widths of the auxiliary input coupling electrode 41*a* and the auxiliary output coupling electrode 41*b* are set equal to those of the input coupling electrode 40*a* and the output coupling electrode 40*b*, and lengths of the auxiliary input coupling electrode 41*a* and the auxiliary output coupling electrode 41*b* are set slightly longer than those of the auxiliary resonant electrodes 31*a* and 31*b*. Desirably an interval between the auxiliary input coupling electrode 41*a* and the auxiliary output coupling electrode 41*b* and the auxiliary resonant electrodes 31*a* and 31*b* is small because the stronger coupling is obtained with decreasing interval. However, because the auxiliary input coupling electrode 41*a*, the auxiliary output coupling electrode 41*b*, and the auxiliary resonant electrodes 31*a* and 31*b* are difficult to produce when the interval decreases, for example, the interval is set to the range of about 0.01 to about 0.5 mm.

In the bandpass filter of the present embodiment, compared with the bandpass filters of the first to third embodiments, the compact, wide-band bandpass filter can be obtained.

Fifth Embodiment

Figure 11:
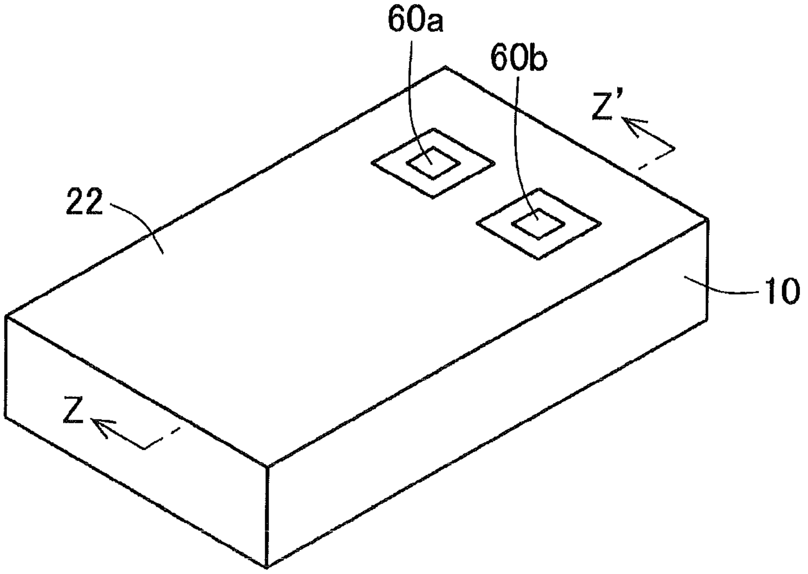
FIG. 11 is an appearance perspective view schematically illustrating a bandpass filter according to a fifth embodiment of the present invention.
Figure 12:
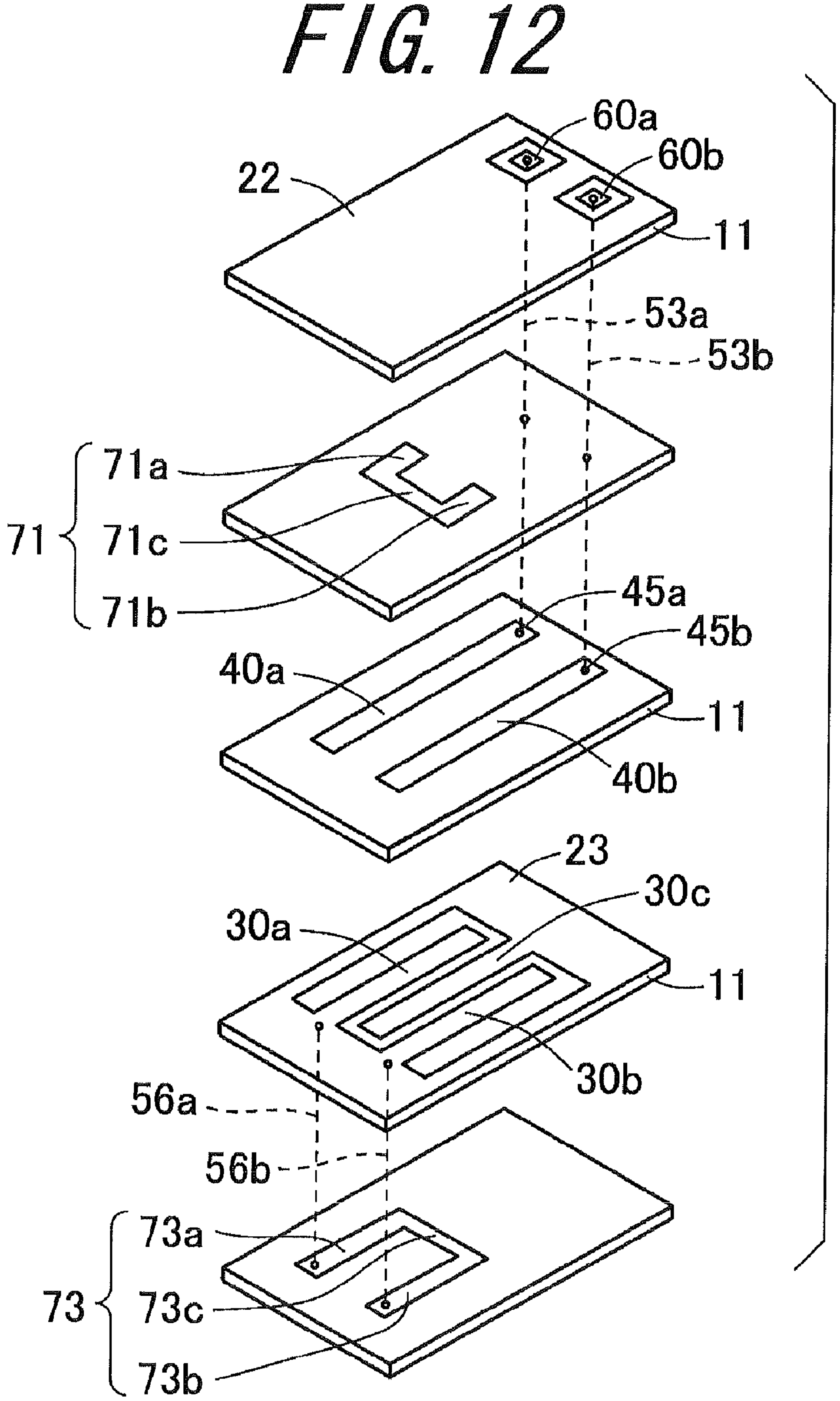
FIG. 12 is an exploded perspective view schematically illustrating the bandpass filter of FIG. 11.
Figure 13:
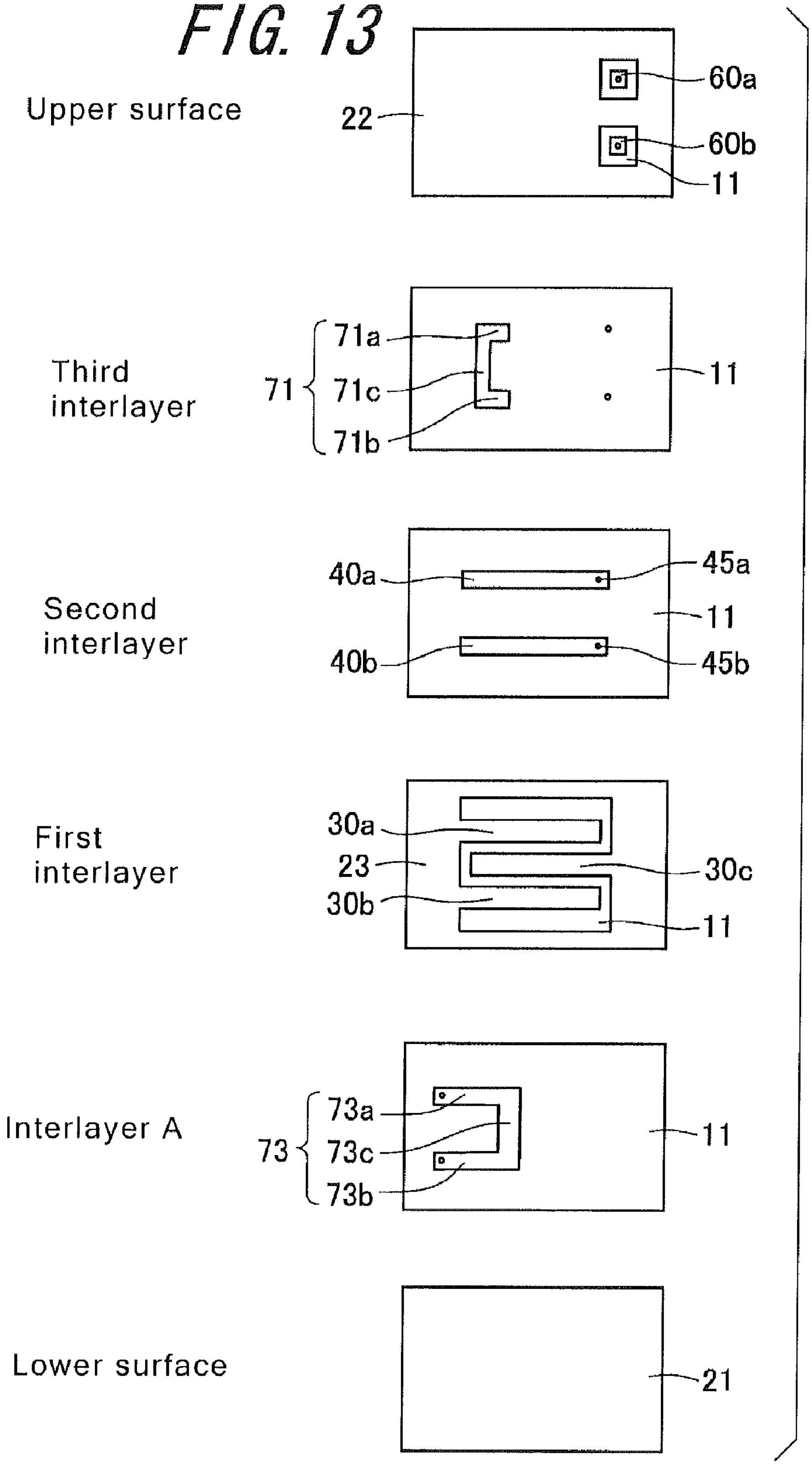
FIG. 13 is a plan view schematically illustrating upper and lower surfaces and an interlayer of the bandpass filter of FIG. 11.
Figure 14:
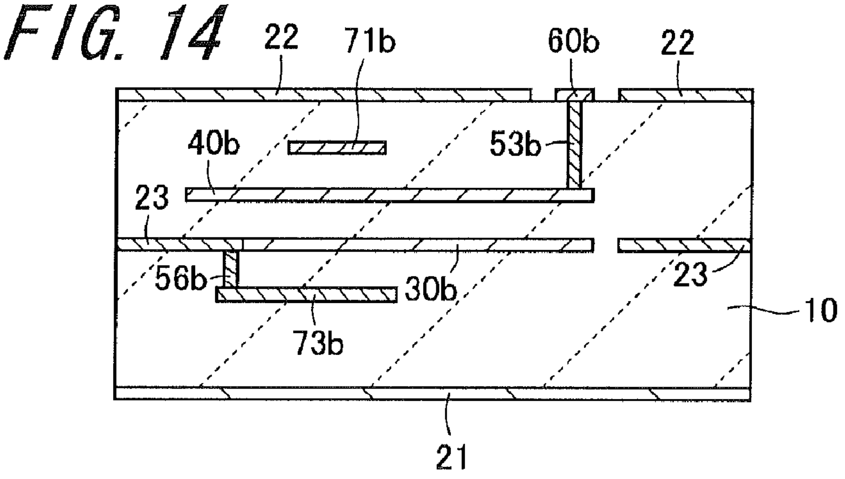
FIG. 14 is a sectional view taken along line Z-Z' of FIG. 11.

FIG. 11 is an appearance perspective view schematically illustrating a bandpass filter according to a fifth embodiment of the present invention. FIG. 12 is an exploded perspective view schematically illustrating the bandpass filter of FIG. 11. FIG. 13 is a plan view schematically illustrating upper and lower surfaces and an interlayer of the bandpass filter of FIG. 11. FIG. 14 is a sectional view taken along line Z-Z' of FIG. 11. In the present embodiment, only the point different from the first embodiment is described, and the similar component is designated by the same reference numeral to omit the overlapping description.

The bandpass filter of the present embodiment includes an input/output resonant electrode coupling conductor 73 that is disposed in an interlayer A different from the first interlayer, second interlayer, and the third interlayer of the laminated body 10 and the interlayer in which the auxiliary resonant electrodes 31*a*, 31*b*, and 31*c* are disposed. In the input/output resonant electrode coupling conductor 73, one end is connected to the annular ground electrode 23 through the first ground penetrating conductor 56*a* in the neighborhood of one end of the input-stage resonant electrode 30*a*, and the other end is connected to the annular ground electrode 23 through the second ground penetrating conductor 56*b* in the neighborhood of one end of the output-stage resonant electrode 30*b*. The input/output resonant electrode coupling conductor 73 includes an input-resonant-electrode-side coupling portion 73*a*, an output-resonant-electrode-side coupling portion 73*b*, and an input/output resonant electrode connecting portion 73*c*. The input-resonant-electrode-side coupling portion 73*a* faces the input-stage resonant electrode 30*a* to provide the electromagnetic field coupling. The output-resonant-electrode-side coupling portion 73*b* faces the output-stage resonant electrode 30*b* to provide the electromagnetic field coupling. The input/output resonant electrode connecting portion 73*c* connects the input-resonant-electrode-side coupling portion 73*a* and the output-resonant-electrode-side coupling portion 73*b*.

In the bandpass filter of the present embodiment, the electromagnetic field coupling between the input-stage resonant electrode 30*a* and the output-stage resonant electrode 30*b* is generated mainly by the magnetic field through the input/output resonant electrode coupling conductor 73, so that the electromagnetic field coupling between the input-stage resonant electrode 30*a* and the output-stage resonant electrode 30*b* generated mainly by the magnetic field can further be strengthened. Therefore, in the passband characteristic, the frequencies of the two attenuation poles generated on the high frequency side of the passband can further be lowered.

Sixth Embodiment

Figure 15:
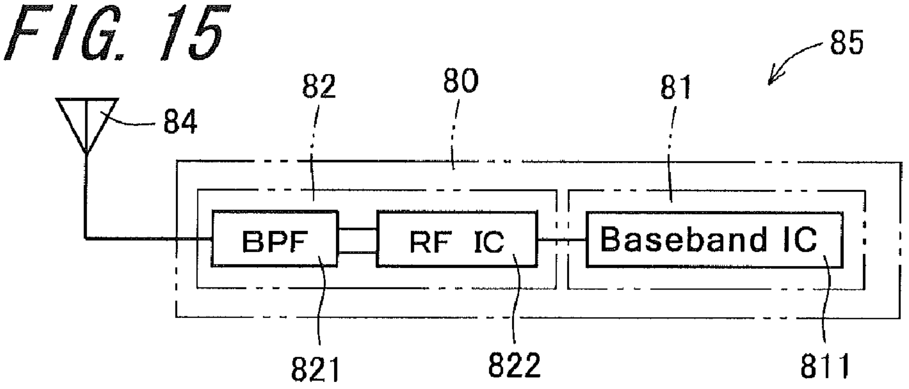
FIG. 15 is a block diagram illustrating a configuration example of a radio communication module and a radio communication device, in which a bandpass filter is used, according to a sixth embodiment of the present invention.

FIG. 15 is a block diagram illustrating a configuration example of a radio communication module 80 and a radio communication device 85, in which a bandpass filter is used, according to a sixth embodiment of the present invention.

The radio communication module 80 of the present embodiment includes a baseband unit 81 that processes a baseband signal and an RF unit 82 that is connected to the baseband unit 81 to process an RF signal after modulation of the baseband signal and before demodulation of the baseband signal.

The RF unit 82 includes a bandpass filter 821 according to the present invention. The bandpass filter 821 attenuates the RF signal obtained by the modulation of the baseband signal and the signals except for the communication band in the received RF signal.

In the specific configuration, a baseband IC 811 is disposed in the baseband unit 81, and RF IC 822 of the RF unit 82 is disposed between the bandpass filter 821 of the RF unit 82 and the baseband unit 81. Note that another circuit may be interposed between the circuits.

An antenna 84 is connected to the bandpass filter 821 of the radio communication module 80 to configure the radio communication device 85 of the present embodiment that transmits and receives the RF signal.

In the radio communication module 80 and radio communication device 85 of the present embodiment having the above-described configuration, filtering is performed to the transmission signal and the received signal using the bandpass filter 821 of the present invention in which the signal loss is reduced in the whole region of the communication band, so that the attenuation of the transmission signal and the received signal passed through the bandpass filter 821 can be reduced in the whole region of the communication band. Therefore, amplification degrees of the transmission signal and the received signal can be reduced while reception sensitivity is improved, and power consumption decreases in an amplifying circuit. Accordingly, the high-reception-sensitivity, low-power-consumption, high-performance radio communication module 80 and radio communication device 85 can be obtained.

In the bandpass filter of the present invention, for example, resin such as epoxy resin and ceramics such as dielectric ceramic can be used as the material for the dielectric layer 11. For example, a glass-ceramic material containing a dielectric ceramic material such as $BaTiO_3$, $Pb_4Fe_2Nb_2O_{12}$, and $TiO_2$ and a glass material such as $B_2O_3$, $SiO_2$, $Al_2O_3$, and ZnO is suitably used. The glass-ceramic material can be burned at a relatively low temperature of about 800° C. to about 1200° C. For example, a thickness of the dielectric layer 11 is set to the range of about 0.01 to about 0.1 mm.

A conductive material mainly containing Ag or an Ag alloy such as Ag—Pd and Ag—Pt or a Cu-system, W-system, Mo-system, or Pd-system conductive material is suitably used as the electrodes and penetrating conductors. For example, thicknesses of the electrodes are set to the range of 0.001 to 0.2 mm.

By way of example, the bandpass filter of the present invention can be prepared as follows. First a preferable organic solvent is added to and mixed in ceramic raw material powders into a slip state, and a ceramic green sheet is formed by a doctor blade technique. Then through-holes that constitute the penetrating conductors are made in the obtained ceramic green sheet using a punching machine, and the through-holes are filled with a conductive paste such as Ag, Ag—Pd, Au, and Cu to form the penetrating conductors. Then various electrodes are formed on the ceramic green sheet using a printing technique. Then the ceramic green sheets are laminated and pressed using a hot press machine, and the laminated body is burned at a peak temperature of about 800° C. to about 1050° C., thereby preparing the bandpass filter of the present invention.

(Modifications)

The present invention is not limited to the first to sixth embodiments, but various modifications and improvements can be made without departing from the scope of the invention.

For example, in the above-described embodiments, the input terminal electrode 60*a* and the output terminal electrode 60*b* are provided. When the bandpass filter is formed in a region of the module board, it is not always necessary to provide the input terminal electrode 60*a* and the output terminal electrode 60*b*. Alternatively, in the module board, the wiring conductor from the external circuit may directly be connected to the input coupling electrode 40*a* and the output coupling electrode 40*b*. At this point, connecting points of the wiring conductor and the input coupling electrode 40*a* and the output coupling electrode 40*b* constitute the electric signal input point 45*a* of the input coupling electrode 40*a* and the electric signal output point 45*b* of the output coupling electrode 40*b*.

In the above-described embodiment, the input coupling electrode 40*a*, the output coupling electrode 40*b*, and the auxiliary resonant electrodes 31*a*, 31*b*, and 31*c* are disposed in the same second interlayer of the laminated body 10. Alternatively, the input coupling electrode 40*a*, the output coupling electrode 40*b*, and the auxiliary resonant electrodes 31*a*, 31*b*, and 31*c* may be disposed in different interlayers of the laminated body 10.

In the above-described embodiment, the auxiliary input coupling electrode 41*a* and the auxiliary output coupling electrode 41*b* are disposed in the same interlayer of the laminated body 10. Alternatively, the auxiliary input coupling electrode 41*a* and the auxiliary output coupling electrode 41*b* may be disposed in different interlayers of the laminated body 10.

In the above-described embodiments, the first ground electrode 21 is disposed in the lower surface of the laminated body 10, and the second ground electrode 22 is disposed in the upper surface of the laminated body 10. Alternatively, for example, the dielectric layer 11 may further be disposed below the first ground electrode 21, or the dielectric layer 11 may further be disposed on the second ground electrode 22.

Although the UWB bandpass filter are described by way of example, obviously the bandpass filter of the present invention can effectively be used in other applications in which the wide band is required.

EXAMPLES

Then, specific examples of the bandpass filter of the present invention will be described.

Electric characteristics of the bandpass filter of the first embodiment having a structure 1 of FIGS. 1 to 4, the bandpass filter of the second embodiment having a structure 2 of FIG. 5, and a bandpass filter that is of a comparative example having a structure 3 in which the input/output coupling conductor 71 is removed from the bandpass filter of the first embodiment were computed using a finite element method. As to computing conditions, a specific permittivity of the dielectric layer 11 was set to 9.2, the width of each of the resonant electrodes 30*a*, 30*b*, and 30*c* was set to 0.4 mm, the length was set to 5.75 mm, and the interval between the adjacent resonant electrodes was set to 0.19 mm. It was assumed that the input end electrode 60*a* and the output end electrode 60*b* were formed into a square whose side is 0.3 mm. As to the input coupling electrode 40*a* and the output coupling electrode 40*b*, the width was set to 0.3 mm, and the length was set to 5.45 mm. In the structure 1 and the structure 2, each of the input-side coupling portion 71*a* and the output-side coupling portion 71*b* of the input/output coupling conductor 71 had the width of 0.2 mm and the length of 0.7 mm. The thickness of the whole bandpass filter was set to 0.60 mm, and the first interlayer was located in the center in the thickness direction. The interval between the first interlayer and the second interlayer was set to 0.05 mm, and the interval between the second interlayer and the third interlayer was set to 0.16 mm.

Figure 16:
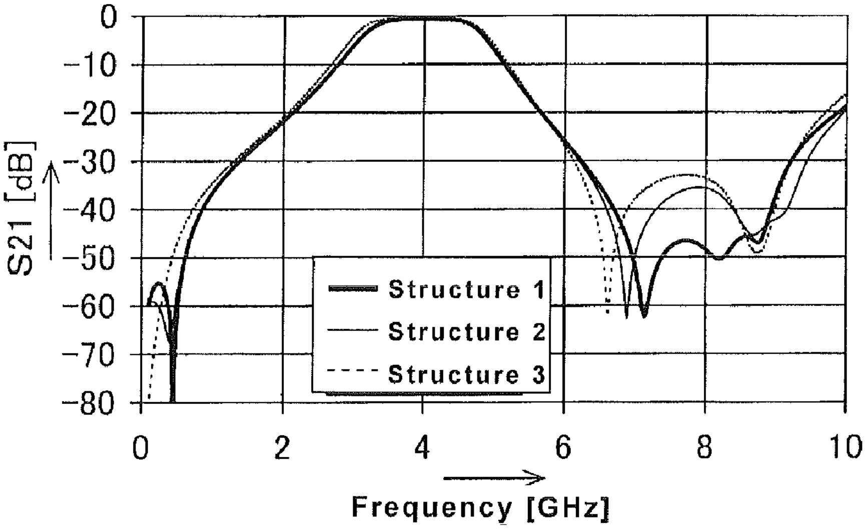
FIG. 16 is a view illustrating electric characteristic simulation results of bandpass filters of the present invention and a comparative example.

FIG. 16 is a graph illustrating simulation results. In FIG. 16, a horizontal axis indicates a frequency, and a vertical axis indicates a passband characteristic (S21). Referring to the graph of FIG. 16, the low-loss characteristic of about 40% in terms of fractional band width, which is much wider than that of the conventional filter in which the quarter-wave resonator is used, is obtained in all the bandpass filters of the structures 1 to 3. In the bandpass filter of the comparative example having the structure 3, although the two attenuation poles are formed at frequencies of 6.3 GHz and 8.8 GHz on the high frequency side of the passband, the attenuation is small, and it is found that the attenuation pole does not exist on the low frequency side of the passband. The input-stage resonant electrode 30*a* and the output-stage resonant electrode 30*b* are disposed close to each other, and the attenuation pole at the frequency of 6.3 GHz is generated by the naturally weak inductive coupling between the input-stage resonant electrode 30*a* and the output-stage resonant electrode 30*b*. Therefore, the attenuation pole at the frequency of 6.3 GHz is not always securely obtained. It is believed that the attenuation pole at the frequency of 8.8 GHz is generated by the half-wave resonance of each of the input coupling electrode 40*a* and the output coupling electrode 40*b*. On the other hand, in the bandpass filters of the present invention having the structure 1 and the structure 2, one attenuation pole is formed on the low frequency side of the passband, and three attenuation poles including the attenuation pole at the frequency of 8.8 GHz generated by the half-wave resonance of each of the input coupling electrode 40*a* and the output coupling electrode 40*b* are formed on the high frequency side of the passband, and therefore the attenuation can increase in the blocking region. Further, in the bandpass filter having the structure 1, the interval between the two attenuation poles at the frequencies of 7.2 GHz and 8.3 GHz except for the attenuation pole at the frequency of 8.8 GHz generated by the half-wave resonance of each of the input coupling electrode 40*a* and the output coupling electrode 40*b* decreases on the high frequency side of the passband, and the attenuation can increase in the frequency region between the two attenuation poles at the frequencies of 7.2 GHz and 8.3 GHz. In the bandpass filter having the structure 2, the interval between the two attenuation poles at the frequencies of 6.9 GHz and 9.1 GHz except for the attenuation pole at the frequency of 8.8 GHz generated by the half-wave resonance of each of the input coupling electrode 40*a* and the output coupling electrode 40*b* increases on the high frequency side of the passband, and the attenuation can increase in the wide frequency range. As can be seen from the results, the flat, low-loss, excellent passband characteristic in the whole of the wide passband and the adequate attenuation in the blocking region are obtained in the bandpass filter of the present invention. Therefore, the effectiveness of the present invention can be confirmed.

Various modifications can be made without departing from the scope of the invention. Accordingly, the embodiments are described only by way of example, the scope of the invention is described only in claims, and the invention is not constrained by the description of the invention. Various modifications and changes of the invention should be included in the scope of the invention.

The invention claimed is:

1. A bandpass filter comprising:

a laminated body comprising a plurality of dielectric layers and interlayers including a first interlayer, a second interlayer and a third interlayer located on a opposite side of the second interlayer of the laminated body from the first interlayer;

a plurality of strip-shaped resonant electrodes in the first inter-layer, comprising:

an input resonant electrode;

an output resonant electrode; and one or an uneven number of resonant electrodes, wherein the plurality of resonant electrodes is arranged in parallel and is configured to electromagnetically couple to each other; and each comprises a ground end connected to a ground potential and an open end, wherein the open ends and the ground ends are alternately arranged;

a strip-shaped input coupling electrode in the second interlayer, comprising:

a first portion facing at least a half portion of the input resonant electrode in a longitudinal direction thereof; and a signal input point located closer to the open end of the input resonant electrode than a center of the first facing portion in the longitudinal direction;

a strip-shaped output coupling electrode in the second interlayer, comprising:

a second portion facing at least a half portion of the output resonant electrode in a longitudinal direction thereof;

a signal output point located closer to the open end of the output resonant electrode than a center of the second facing portion in the longitudinal direction; and a coupling conductor in the third interlayer, comprising:

an input coupling portion facing both the input coupling electrode and the input resonant electrode, and configured to electromagnetically couple to the input coupling electrode and the input resonant electrode;

an output coupling portion facing both the output coupling electrode and the output resonant electrode, and configured to electromagnetically couple to the output coupling electrode and the input resonant electrode; and a connecting portion electrically coupling the input coupling portion and the output coupling portion.

2. A radio communication module comprising:

an RF unit comprising the bandpass filter according to claim 1; and a baseband unit that is connected to the RF unit.

3. A radio communication device comprising:

an RF unit comprising the bandpass filter according to claim 1;

a baseband unit that is connected to the RF unit; and an antenna that is connected to the RF unit.

4. The bandpass filter according to claim 1, wherein:

the input coupling portion comprises a first half portion and a second half portion divided in the longitudinal direction, wherein the first half portion is closer to the signal input point of the input coupling electrode than the second half portion;

the output coupling portion comprises a third half portion and a fourth half portion, wherein the third half portion is closer to the signal output point of the output coupling electrode than the fourth half portion.

5. The bandpass filter according to claim 4, wherein:

the connection portion is coupled to the first half portion and the third half portion.

6. The bandpass filter according to claim 4, wherein:

the connection portion is coupled to the second half portion and the fourth half portion.

7. The bandpass filter according to claim 1, wherein:

the input coupling portion is parallel to the input resonant electrode and the input coupling electrode; and the output coupling portion is parallel to the output resonant electrode and the output coupling electrode; and the output coupling portion is orthogonal to a longitudinal direction of each of the resonant electrodes when viewed from above.

8. The bandpass filter according to claim 1, further comprising a ground electrode in the first interlayer:

having an annular shape;

surrounding the plurality of resonant electrodes;

coupled to ground ends of the resonant electrodes; and coupled to the ground potential.

9. The bandpass filter according to claim 8, further comprising an auxiliary input resonant electrode, the auxiliary input resonant electrode:

located in an interlayer other than the first interlayer;

coupled to the open end of the input resonant electrode; and comprising:

a first input region facing a part of the ground electrode; and a second input region facing a part of the input resonant electrode.

10. The bandpass filter according to claim 9, wherein the auxiliary input resonant electrode is located in the second interlayer.

11. The bandpass filter according to claim 9, further comprising an auxiliary input coupling electrode, the auxiliary input coupling electrode:

located in an interlayer different from the first interlayer, the second interlayer and the interlayer comprising the auxiliary input resonant electrode;

comprising:

a third input region facing a part of the auxiliary input resonant electrode; and a fourth input region facing a part of the input coupling electrode, and coupled to the signal input coupling point.

12. The bandpass filter according to claim 11, wherein the auxiliary input coupling electrode is located in the third interlayer.

13. The bandpass filter according to claim 11, further comprising an auxiliary output coupling electrode, the auxiliary output coupling electrode:

located in an interlayer different from the first interlayer, the second interlayer and the interlayer comprising the auxiliary output resonant electrode;

comprising:

a third output region facing a part of the auxiliary output resonant electrode; and a fourth output region facing a part of the output coupling electrode, and coupled to the signal output coupling point.

14. The bandpass filter according to claim 13, wherein the auxiliary output coupling electrode is located in the third interlayer.

15. The bandpass filter according to claim 8, further comprising an auxiliary output resonant electrode, the auxiliary output resonant electrode:

located in an interlayer other than the first interlayer;

coupled to the open end of the output resonant electrode, and comprising:

a first output region facing a part of the ground electrode; and a second output region facing a part of the input resonant electrode.

16. The bandpass filter according to claim 15, wherein the auxiliary output resonant electrode is located in the second interlayer.

17. The bandpass filter according to claim 8, further comprising one or an uneven number of auxiliary resonant electrodes, the auxiliary resonant electrodes:

located in an interlayer other than the first interlayer;

coupled to the one or uneven number of resonant electrodes, respectively; and each comprising:

a first region facing a part of the ground electrode; and a second region facing a part of each of one or uneven number of the resonant electrodes, and coupled to each of the one or uneven number of the ground ends.

18. The bandpass filter according to claim 17, wherein the auxiliary resonant electrodes are located in the second interlayer.

* * * * *